United States Patent
Kamada

(10) Patent No.: US 8,203,670 B2
(45) Date of Patent: Jun. 19, 2012

(54) BACKLIGHT UNIT AND LIQUID CRYSTAL DISPLAY INCLUDING DIFFUSION UNIT AND LENTICULAR LENS LAYER

(75) Inventor: Kentaro Kamada, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 458 days.

(21) Appl. No.: 12/441,926

(22) PCT Filed: Jun. 26, 2007

(86) PCT No.: PCT/JP2007/062756
§ 371 (c)(1),
(2), (4) Date: Mar. 19, 2009

(87) PCT Pub. No.: WO2008/047501
PCT Pub. Date: Apr. 24, 2008

(65) Prior Publication Data
US 2009/0256994 A1    Oct. 15, 2009

(30) Foreign Application Priority Data
Oct. 20, 2006  (JP) .................................. 2006-285790

(51) Int. Cl.
*G02F 1/1335* (2006.01)
(52) U.S. Cl. ........................................... 349/69; 362/80

(58) Field of Classification Search ................. 349/58, 349/61, 64; 362/97.1, 614
See application file for complete search history.

(56) References Cited

U.S. PATENT DOCUMENTS

| 7,667,787 B2 * | 2/2010 | Mahama et al. ............... 349/64 |
| 2006/0044830 A1 * | 3/2006 | Inoue et al. ................. 362/614 |
| 2007/0002583 A1 * | 1/2007 | Lee et al. ..................... 362/606 |

FOREIGN PATENT DOCUMENTS

| JP | 02-183903 A | 7/1990 |
| JP | 04-071105 A | 3/1992 |
| JP | 07-049423 A | 2/1995 |
| JP | 07-050103 A | 2/1995 |
| JP | 08-094851 A | 4/1996 |
| JP | 08-122774 A | 5/1996 |
| JP | 08-146231 A | 6/1996 |

OTHER PUBLICATIONS

Official Communication issued in International Patent Application No. PCT/JP2007/062756, mailed on Jul. 24, 2007.

* cited by examiner

*Primary Examiner* — Akm Ullah
(74) *Attorney, Agent, or Firm* — Keating & Bennett, LLP

(57) ABSTRACT

In a backlight unit including fluorescent tubes and a diffusion unit overlapped with each other, optical materials with different transmittances are contained in a holding layer positioned between a diffusion plate and a lenticular lens layers.

17 Claims, 14 Drawing Sheets

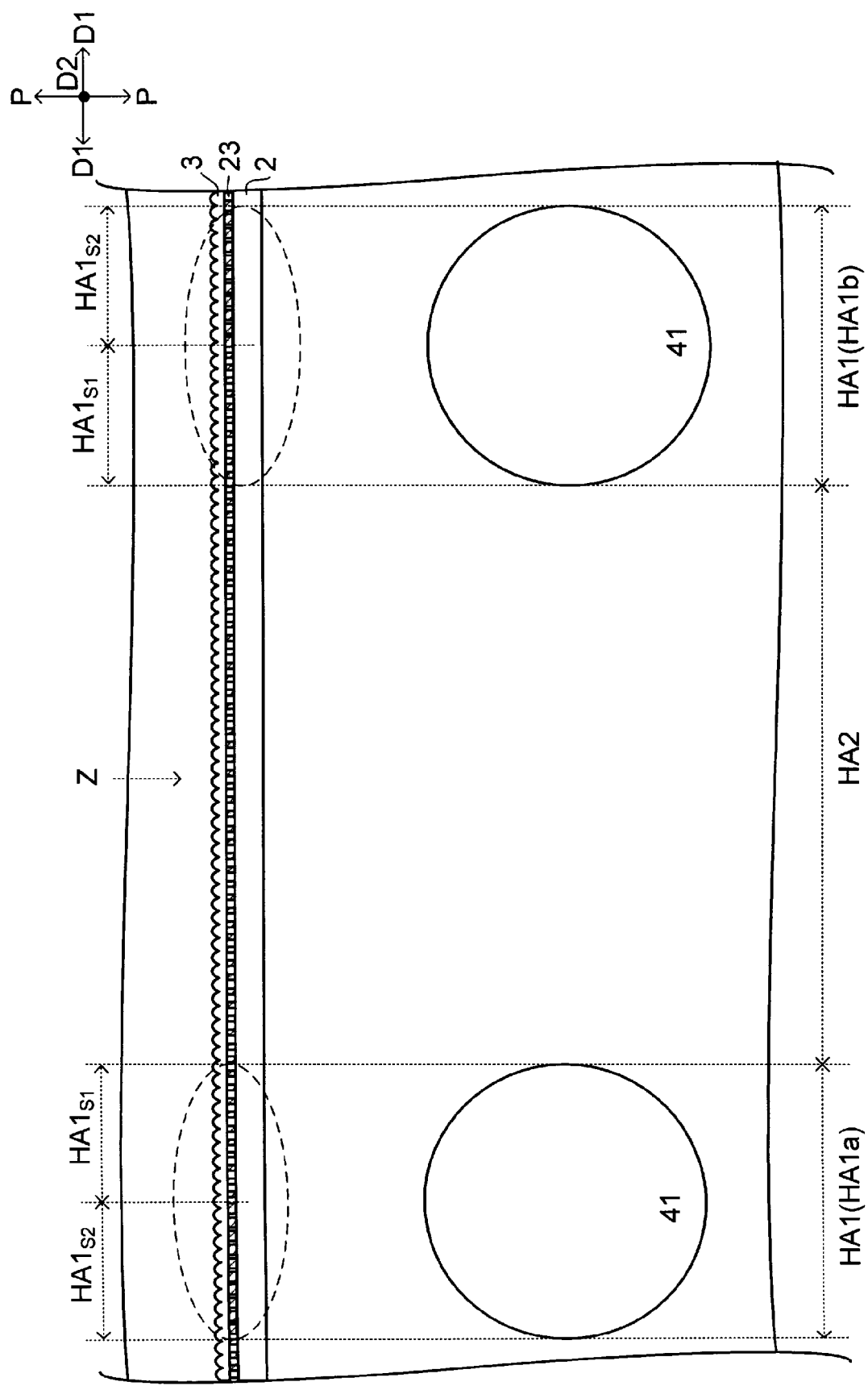

BACKLIGHT UNIT AND LIQUID CRYSTAL DISPLAY INCLUDING DIFFUSION UNIT AND LENTICULAR LENS LAYER

BACKGROUND OF THE INVENTION

1. Field of the Invention

The present invention relates to a backlight unit that emits light, and to a liquid crystal display device that uses the light from the backlight unit.

2. Description of the Related Art

Various kinds of backlight units are conventionally developed that provide light to liquid crystal display panels (non-luminous type display panels) in liquid crystal display devices. As light sources incorporated in area light type backlight units or the like, there may be mentioned, fluorescent tubes, such as hot-cathode tubes or cold-cathode tubes, and LEDs (light emitting diodes).

These light sources, when used in modern slim-type, large-screen liquid crystal televisions (liquid crystal display devices), cause various problems. For example, to emit light to a large-screen liquid crystal display panel, a relatively large number of light sources are required to be incorporated in a backlight unit. This increases the size of the backlight unit itself, and thus makes it difficult to obtain a slim-type liquid crystal television. Furthermore, the use of a large number of light sources leads to an increase in the cost of the backlight unit.

To prevent the size and the cost of the backlight unit from increasing, an increase in the light emission amount of the light sources in the backlight unit is required. With light sources having a large light emission amount (in short, with high-efficiency light sources), the increase in the size of the backlight unit is prevented due to a reduction in the number of light sources, which in turn reduces the cost of the backlight unit.

When the number of light sources in a backlight unit is reduced by employing high-efficiency light sources, however, the intervals between light sources are relatively widened. Consequently, for example, in a case where the light sources are fluorescent tubes, as shown in a sectional view in FIG. 14, the intervals V' between fluorescent tubes 141 and 141 are widened. As a result, whereas portions over the fluorescent tubes 141 are bright, portions over the intervals V' between the fluorescent tubes 141 and 141 are dim. (Note that "over" means the direction opposite to the direction from the fluorescent tube 141 to a reflecting frame 142). That is, there arises a relatively large difference in brightness (unevenness in light amount) between the portions over the fluorescent tubes 141 and the portions over the intervals between the fluorescent tubes 141 and 141, and this unevenness in light amount leads to unevenness in the light amount of a liquid crystal display device.

To solve such problems of unevenness in light amount, an idea has been proposed, as in JP 08-122774, of using a multi-layer type light diffusion plate (also called a diffusion unit) including a lenticular lens layer.

The diffusion unit disclosed in JP 08-122774, however, is not used for preventing unevenness in light amount in a liquid crystal display device, but is used for adjusting viewing angle in a liquid crystal display device. Consequently, although the diffusion unit is incorporated in a liquid crystal display device, it is unclear whether or not it can prevent unevenness in light amount.

SUMMARY OF THE INVENTION

Preferred embodiments of the present invention provide a diffusion unit capable of preventing unevenness in light amount, and provide a liquid crystal display device that incorporates such a diffusion unit.

According to a preferred embodiment of the present invention, a backlight unit includes: a plurality of light sources; and a diffusion unit in which a lenticular lens layer is disposed, with an optical member containing dispersed particles interposed in between, on a diffusion plate receiving light from the light sources, the diffusion unit being laid over the light sources.

One example is a backlight unit in which a plurality of optical members with different transmissivities are included in an interposed layer located between the diffusion plate and the lenticular lens layer.

A more specific example is a backlight unit in which linear-shaped optical members are arrayed in parallel or substantially parallel in the interposed layer in the diffusion unit, and in which when a region defined by linear optical members with the same transmissivity being gathered together is called a transmissive region, a plurality of transmissive regions with different transmissivities are formed in the surface of the interposed layer.

In the backlight unit described above, it is preferable that the transmissive regions (first transmissive regions) laid at least over the light sources in the overlay direction of light sources and the diffusion unit have a lower transmissivity than the transmissive regions (second transmissive regions) laid only over the intervals between the light sources in the overlay direction of the light sources and the diffusion unit.

With this design, the light with a relatively high intensity (head-on light, etc.) from the light sources reaches the first transmissive regions laid at least over the light sources. However, since the first transmissive regions have a relatively low transmissivity, the amount of light which manages to travel by passing through them is small. Thus, in the first transmissive regions, no rise in brightness resulting from the passage of an excessive amount of light occurs.

On the other hand, the light which travels by passing through the intervals between light sources reaches the second transmissive regions laid only over the intervals between light sources. However, since the second transmissive regions have a relatively high transmissivity, it is easier for the amount of light which travels by passing through them to reach a certain amount. Thus, no drop in brightness resulting from a shortage of light occurs. As a result, no unevenness in the amount of backlight occurs in the backlight unit described above.

Another example is a backlight unit in which a plurality of optical members with different reflectivities are contained in an interposed layer located between the diffusion plate and the lenticular lens layer.

A more specific example is a backlight unit in which linear-shaped optical members are arrayed in parallel or substantially parallel with gaps secured therebetween in the interposed layer, and when a region formed by linear optical members with the same reflectivity being gathered together is called a reflective region, a plurality of reflective regions with different reflectivities are provided in the surface of the interposed layer.

In the backlight unit described above, it is preferable that the reflective regions (first reflective regions) laid in the overlay direction of light sources and the diffusion unit, at least over the light sources and at least over portions of the intervals between light sources lying in the array direction of the optical members have a higher reflectivity than the reflective regions (second reflective regions) laid, in the overlay direction of the light sources and the diffusion unit, at least over the centers of the intervals between light sources lying in the array direction of the optical members.

With this design, a large portion of the light which diverges as it travels from the light sources reaches the first reflective regions—laid at least over the light sources—from which the light is then reflected in various directions. Here, the reflected light travels so as to return to the diffusion plate, from which the light traveling to the first reflective regions has originated. This returning light is then reflected on one surface of the diffusion plate, and travels toward the interposed layer again. When the reflected light travels toward the gaps between optical members, the light then passes through the gaps. That is, by being reflected by the first reflective regions, the light which has failed to pass through the optical members passes through the diffusion unit (the reflected light is reused).

In addition, the second reflective regions—laid at least over the centers of the intervals between the light sources lying in the array direction of the optical members—tend to be portions that light is most unlikely to reach; however, the second reflective regions have a relatively low reflectivity. Thus, light tends to be transmitted through rather than be reflected on the second reflective regions. As a result, no unevenness in the amount of backlight occurs in the backlight unit described above.

Still another example is a backlight unit in which, in an interposed layer located between the diffusion plate and the lenticular lens layer, when the intervals between optical members created by the optical members being laid discontinuously is called gaps through which light can pass, a plurality of gaps with different areas are formed in the surface of the interposed layer.

More specific example is a backlight unit, in which, in the interposed layer of the diffusion unit, gaps with the same area are gathered together as a result of linear optical members with the same area being gathered together, and when a region formed by gaps with the same area being gathered together is called a light-passage region, a plurality of light-passage regions with different gap ratios are provided in the surface of the interposed layer.

In the backlight unit described above, it is preferable that the light-passage regions (first light-passage regions) laid at least over the light sources in the overlay direction of the light sources and the diffusion unit have a lower gap ratio than the light-passage region (second light-passage regions) laid only over the intervals between light sources in the overlay direction of the light sources and the diffusion unit.

With this design, a relatively large amount of light from the light sources reaches the first light-passage regions laid at least over the light sources. However, due to the first light-passage regions having a relatively low gap ratio, only a small amount of light manages to travel by passing through the gaps. Thus, in the first light-passage regions, no increase in brightness resulting from the passage of an excessive amount of light occurs.

On the other hand, light which travels by passing through the intervals between light sources reaches the second light-passage regions laid only over the intervals between light sources. However, due to the second light-passage regions having a relatively high gap ratio, it is easier for the amount of light which travels by passing through the intervals to reach a certain amount, and thus no drop in brightness resulting from a shortage of light occurs. As a result, no unevenness in the amount of backlight occurs in the backlight unit described above.

It is preferable that the optical members contained in the first light-passage regions have a lower transmissivity than the optical members contained in the second light-passage regions.

With this design, whereas the light which manages to travel by passing through the optical members contained in the first light-passage regions tend to be reduced, the light which travels by passing through the optical members contained in the second light-passage regions tend to be increased. Thus, rise in brightness in the first light-passage regions and drop in brightness in the second light-passage regions are reliably prevented, and thus unevenness in the amount of backlight is further prevented from occurring in the backlight unit described above.

Preferably, in the first light-passage regions located next to the center of the surface of the diffusion unit, a plurality of portions with different gap ratios are laid, and among the portions, the portions having a high gap ratio are located closer to the center of the surface of the diffusion unit, while portions having a low gap ratio be located away from the center of the surface of the diffusion unit.

With this design, no shortage of brightness occurs in the portions located closer to the center of the surface of the diffusion unit in the first light-passage region. Thus, relatively high brightness is secured at the screen center of the liquid crystal display device incorporating the backlight unit described above. Thus, no degradation in the display quality of the liquid crystal display device occurs that results from a shortage of brightness at the screen center in the liquid crystal display device.

In a case where the plurality of portions with different gap ratios in the first light-passage regions divide into two kinds, the backlight unit may be, as one example, so designed that the portions with a high gap ratio have the same gap ratio as the second light-passage regions laid next to the first light-passage regions, and that the portions with a low gap ratio have a lower gap ratio than the second light-passage regions laid next to the first light-passage regions.

There is no particular restriction on the light sources in the backlight unit. They may be, for example, fluorescent tubes which are linear light sources or light-emitting elements which are point light sources. However, it is preferable that the linear light sources be arrayed in the same direction in which the optical members are arrayed. This permits the linear light from the linear light sources to effectively reach the optical members which are transmissive, reflective or the like.

On the other hand, when the light sources are point light sources and these are arrayed in a matrix, the continuous point light from the point light sources arrayed in the same direction in which rows extend can be regarded as forming linear light, and the continuous point light from the point light sources arrayed in the same direction in which columns extend can be regarded as forming linear light. Thus, in a case where the point light sources are arrayed in a matrix, preferably, the direction in which rows extend or the direction in which the columns extend is the same as the direction in which the optical members are arrayed. This permits the continuous light from the point light sources (linear light) to effectively reach the optical members which are transmissive, reflective or the like.

Although there is no particular restriction on the material of dispersed particles contained in the optical members, examples of the dispersed particles include particles of titanium oxide.

On the surface of each lenticular lens in the lenticular lens layer, there are formed a plurality of bumps; preferably, the length direction of the bumps extends in the same direction in which the optical members extend.

In a liquid crystal display device, etc. incorporating a backlight unit, typically, data lines, which feed data signals to the pixels of a liquid crystal display panel, are arrayed in parallel. In some cases, the direction in which the data lines are arrayed is the same as the direction in which the optical members are arrayed in the backlight unit. However, in the backlight unit, moiré, which is caused by the arrangement of the optical members and the arrangement of data lines, is prevented by the plurality of bumps.

A liquid crystal display device having a backlight unit as described above and a liquid crystal display panel that receives light from the backlight unit can also be said to be within the scope of the present invention.

According to various preferred embodiments of the present invention, a diffusion unit includes, in its surface, regions with different characteristics (in terms of transmittance, reflectance, etc.). Thus, with the plurality of regions with different characteristics it has, the diffusion unit can vary differently the amount of light from light sources. As a result of light amount being varied, unevenness in the amount of backlight from the backlight unit is prevented. As a result, also in a liquid crystal display device incorporating the backlight unit, unevenness in light amount is prevented, and display quality is enhanced.

These and other elements, features, characteristics, steps, and advantages of the present invention will become more apparent from the following detailed description of preferred embodiments thereof with reference to the drawings.

BRIEF DESCRIPTION OF THE DRAWINGS

FIG. 7 is an enlarged sectional view showing another example of FIG. 5.

DETAILED DESCRIPTION OF THE PREFERRED EMBODIMENTS

First Preferred Embodiment

A first preferred embodiment according to the present invention will be described below with reference to the accompanying drawings. Note that reference signs and hatchings in some drawings are omitted for the sake of convenience; in such cases, other drawings are to be referred to. Note also that a solid black circle on a drawing means a direction perpendicular to the plane of the figures.

Figure 12:
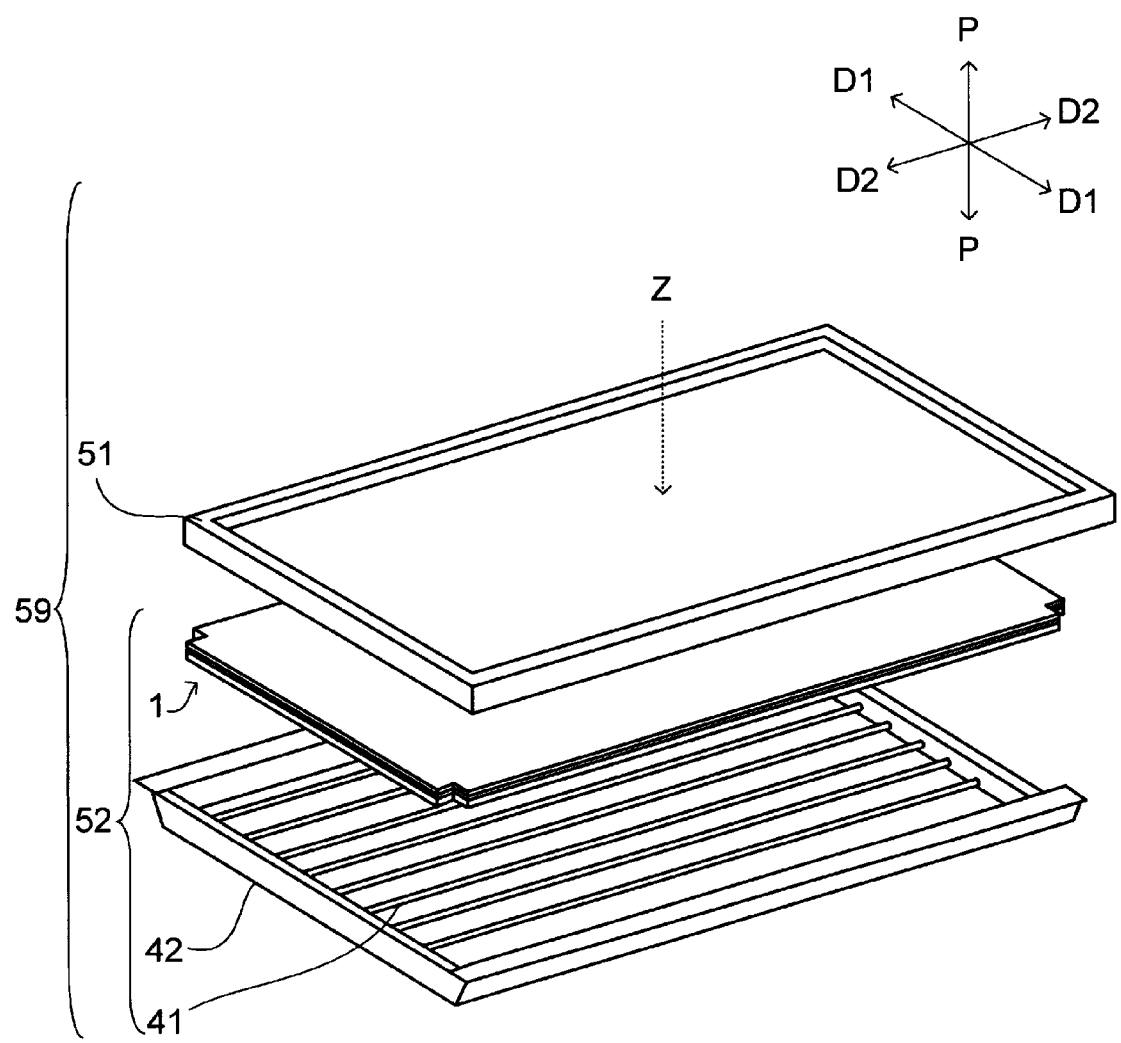
FIG. 12 is an exploded perspective view of a liquid crystal display device incorporating fluorescent tubes as light sources.
Figure 13:
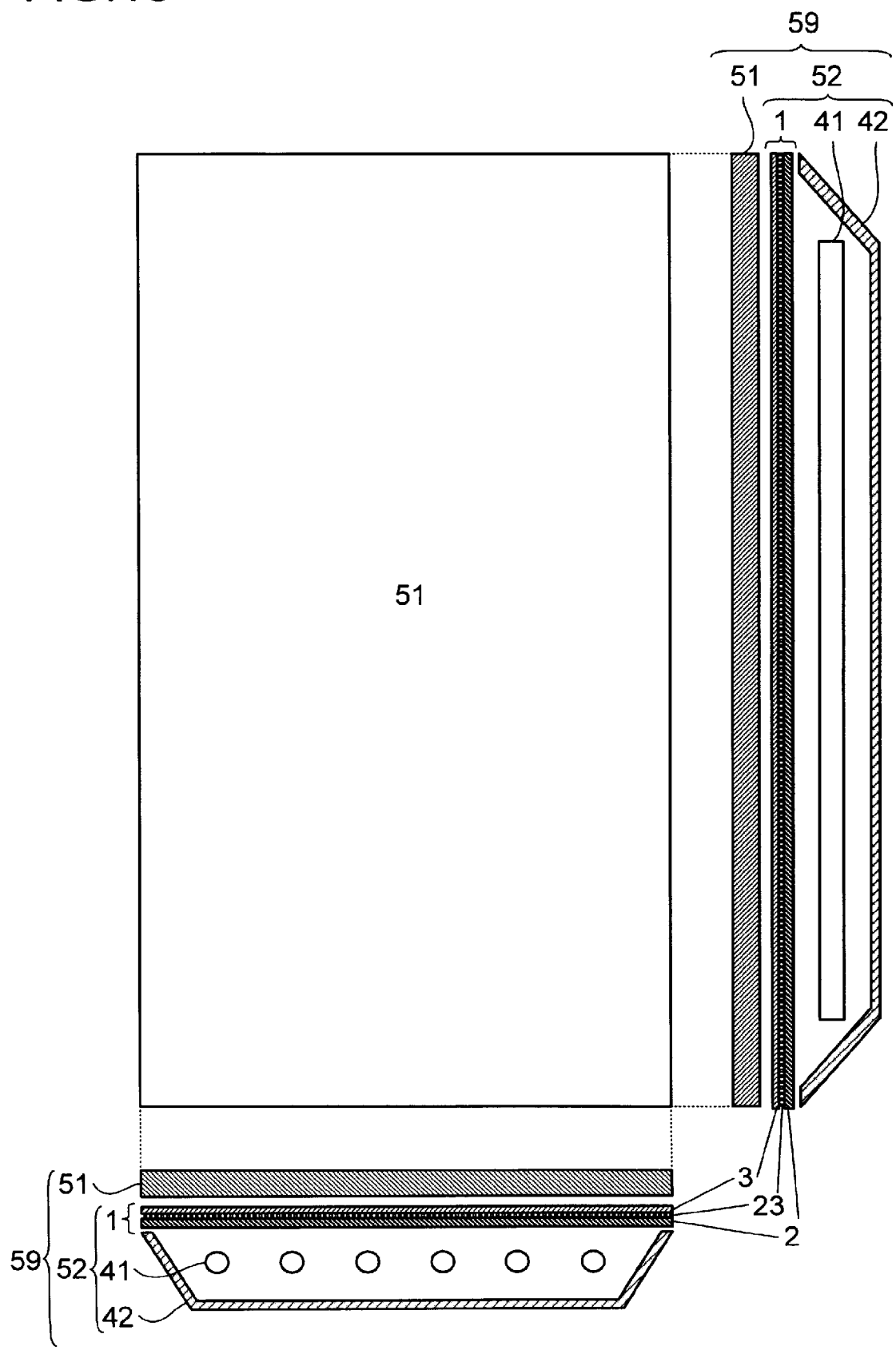
FIG. 13 is a three-view drawing of a liquid crystal display device.
Figure 14:
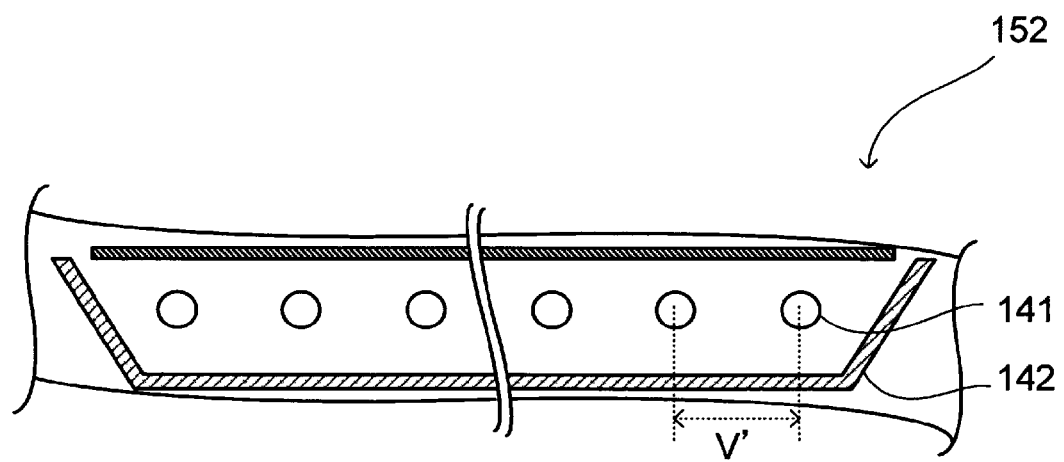
FIG. 14 is a sectional view of a conventional backlight unit incorporated in a liquid crystal display device.

As shown in an exploded perspective view in FIG. 12 and a three-view drawing (a plan view, a shorter-side sectional view, and a longer-side sectional view) in FIG. 13, a liquid crystal display device 59 has a liquid crystal display panel 51 and a backlight unit 52.

The liquid crystal display panel 51 preferably is a non-luminous type display panel, and it performs a display function by receiving light (backlight) from the backlight unit 52. Thus, when the light from the backlight unit 52 evenly illuminates the entire surface of the liquid crystal display panel 51, the display quality of the liquid crystal display panel 51 is enhanced.

The backlight unit 52 includes, so as to produce backlight, fluorescent tubes (light sources) 41, a reflecting frame 42, and a diffusion unit 1.

The fluorescent tubes (linear light sources) 41 are cold-cathode tubes or hot-cathode tubes, and are linear in shape (bar-shaped, column-shaped, or otherwise shaped) as shown in FIG. 12 and FIG. 13. Moreover, as these fluorescent tubes 41, a plurality of them are incorporated, arrayed in parallel, inside the backlight unit 52 (though only part of those fluorescent tubes are shown in the drawings for the sake of convenience). Note that, hereinafter, the array direction of the fluorescent tubes 41 will be referred to as the first direction D1, and the linear direction (length direction) of the fluorescent tubes 41 will be referred to as the second direction D2.

The reflecting frame 42 is a box-shaped member having an open side, and the interior surface of the box shape is covered with a light-reflective resin, metal, or other material. The fluorescent tubes 41 are located inside the box shape. Thus, a portion of the radiating light (light radiating from the centers of the fluorescent tubes 41) emitted from the fluorescent tubes 41 is reflected and directed into the diffusion unit 1, etc. Note that the member forming the reflecting frame 42 may itself be formed of a light-reflective resin, metal, or other material. This makes it possible to omit resin, metal, or another material with which to cover the interior surface of the reflecting frame 42.

The diffusion unit 1 is a unit preferably including a plurality of sheets, and is laid over the fluorescent tubes 41 so as to cover them (the direction of overlaying is called the overlay direction P). Thus, the diffusion unit 1 receives the light (emitted light) from the fluorescent tubes 41 and the light (reflected light) from the reflecting frame 42. In addition, to refract or otherwise treat the received light, the diffusion unit 1 includes a diffusion plate 2 and a lenticular lens layer 3. Moreover, optical members OD are interposed between the diffusion plate 2 and the lenticular lens layer 3.

Note that unillustrated adhesive (an adhesive layer) is applied to the contact portion between the optical members OD and the diffusion plate 2, and to the contact portion between the optical members OD and the lenticular lens layer 3. Thus, the diffusion plate 2 and the lenticular lens layer 3 are preferably integral with each other.

Here, the diffusion unit 1 will be described in detail. The diffusion plate 2 incorporated in the diffusion unit 1 is preferably formed of a light reflective resin, such as polycarbonate or methacrylate methylstyrene.

On the other hand, the lenticular lens layer 3 is preferably formed of polyethylene terephthalate or the like and has a planar supporter 3a and cylindrical lenses (lenticular lenses) LS formed on the supporter 3a (see FIGS. 2A and 2B described later). In addition, as the cylindrical lenses LS, a plurality of such lenses are arrayed in parallel on the surface of the supporter 3a. Note that the array direction of the cylindrical lenses LS is the same as the first direction D1, which is the array direction of the fluorescent tubes 41, and furthermore, the length direction of the cylindrical lenses LS is the same as the second direction D2, which is the length direction of the fluorescent tubes 41.

The optical members OD are contained in a space (interposed layer 23) created as a result of the diffusion plate 2 and the lenticular lens layer 3 facing each other with an interval in between. Thus, the two sheets 2 and 3 are bonded together and made integral by the strength of the adhesive applied to the optical members OD. Note that the optical members OD are preferably formed into the shape of lines (or plates or the like) arrayed in parallel with intervals SP therebetween in the surface of the interposed layer 23 (see FIGS. 2A and 2B described later). Note that the array direction of the optical members OD is the same as the first direction D1, which is the array direction of the cylindrical lenses LS, and the linear direction (length direction) of the optical members OD is the same as the second direction D2, which is the length direction of the cylindrical lenses LS.

A plurality of the optical members OD are contained in the interposed layer 23, but not all the optical members OD have the same characteristics. A description will now be given of the points where their characteristics vary. First, a description will be given from the viewpoint of the transmittance of the optical members OD.

From the viewpoint of transmittance as one of their characteristics, a plurality of optical members OD with different transmissivities are contained in the interposed layer 23. That is, instead of optical members OD all having the same transmissivity, optical members OD having different transmissivities are mixedly contained in the interposed layer. More specifically, when a region formed by linear optical members OD with the same transmissivity being gathered together is called a transmissive region PA, a plurality of transmissive regions PA with different transmissivities are formed in the surface of the interposed layer 23. Thus, a plurality of transmissive regions PA with different transmissivities lie mixedly in the surface of the diffusion unit 1.

Figure 1:
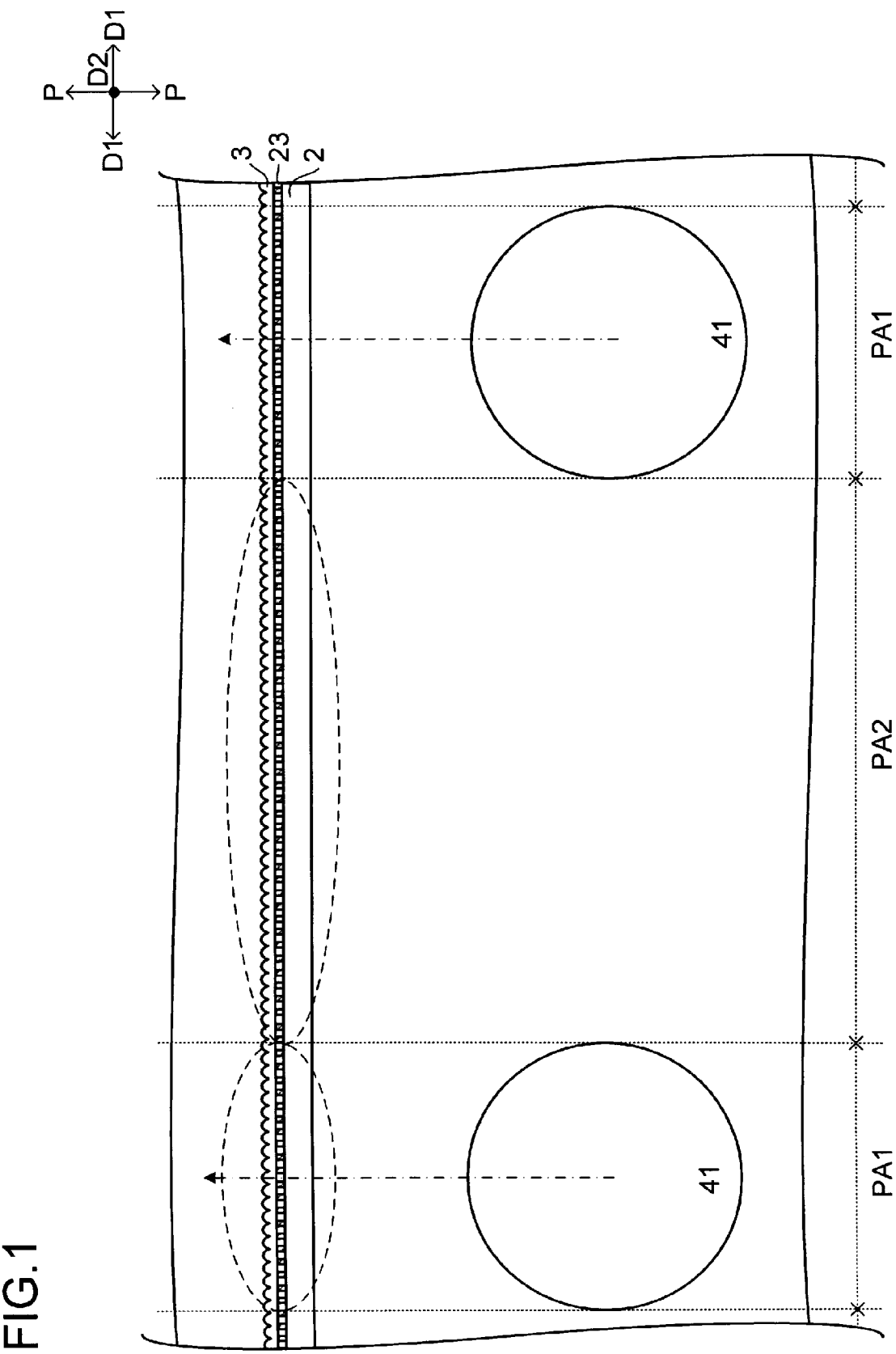
FIG. 1 is an enlarged view of the shorter-side section in FIG. 13 described later.
Figure 2A:
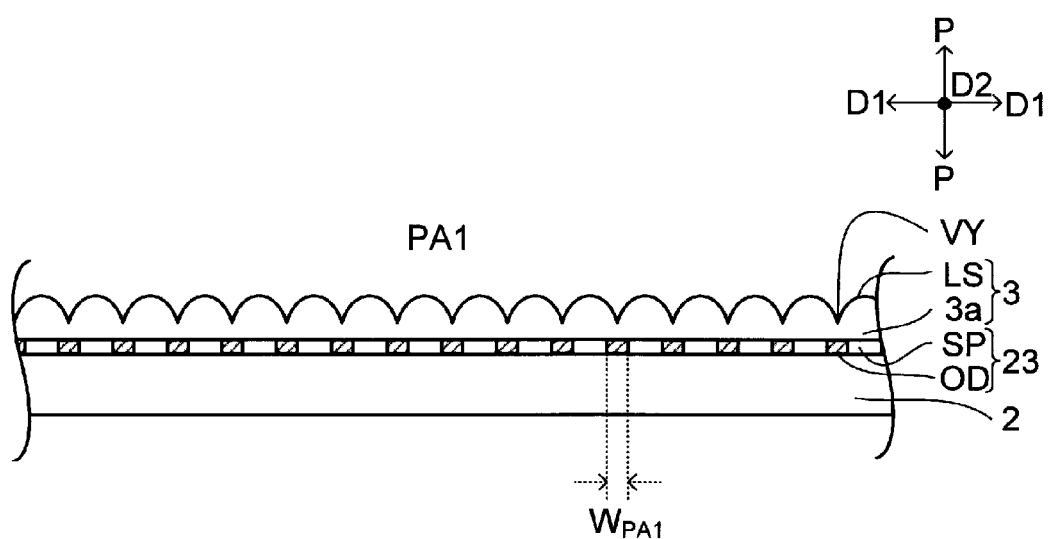
FIG. 2A is an enlarged sectional view of the first transmissive region shown in FIG. 1.
Figure 2B:
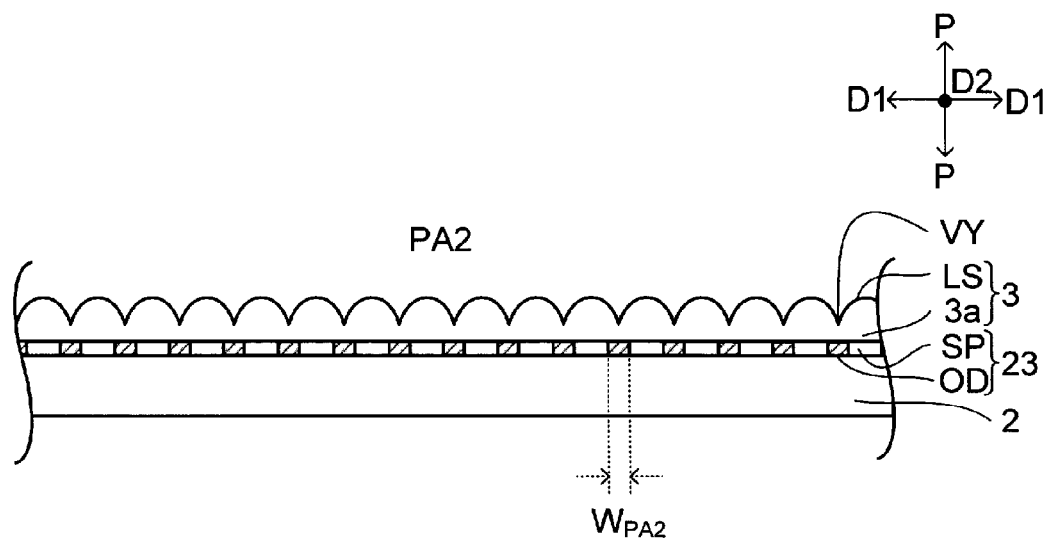
FIG. 2B is an enlarged sectional view of the second transmissive region shown in FIG. 1.

This backlight unit 52 is shown in detail in FIG. 1, which is an enlarged sectional view of the shorter-side section in FIG. 13, and in FIGS. 2A and 2B (which are enlarged sectional views of the portions encircled by broken lines in FIG. 1). Note that $W_{PA1}$, which represents the width (shorter-side) of the optical members OD in the later-described first transmissive regions PA1, and $W_{PA2}$, which represents the width of the optical members OD in the later-described second transmissive regions PA2, are the same.

It is preferable that the transmissive regions PA (called the first transmissive regions PA1) laid over the fluorescent tubes 41 in the overlay direction P of the fluorescent tubes 41 and the diffusion unit 1 have a lower transmissivity than the transmissive regions PA (called the second transmissive regions PA2) laid only over the intervals between the fluorescent tubes 41 and 41 in the overlay direction P of the fluorescent tubes 41 and the diffusion unit 1.

Although, generally, the light from the fluorescent tubes 41 diverges as it travels, it appears linear in shape owing to the linear shape of the fluorescent tubes 41. Such light is called linear light, and of linear light, the portions of light (called the head-on light; see the dash-and-dot-line arrows) traveling from the fluorescent tubes 41 into the diffusion unit 1 along the overlay direction P, in particular, have a relatively high intensity. Thus, the portions of the diffusion unit 1 where it is laid over the fluorescent tubes 41 in the overlay direction P tend to be relatively bright. By contrast, the head-on light cannot reach the portions of the diffusion unit 1 where it is laid over the intervals between the fluorescent tubes 41 and 41 in the overlay direction P. Thus, these portions tend to be relatively dim.

Here, the backlight unit 52 includes the first transmissive regions PA1 in the portions of the diffusion unit 1 where it is laid over the fluorescent tubes 41 in the overlay direction P, and includes the second transmissive regions PA2 in the portions of the diffusion unit 1 where it is laid over the intervals between the fluorescent tubes 41 and 41. Accordingly, in this backlight unit 52, the head-on light reaches the first transmissive regions PA1, and the light that travels by passing through the intervals between the fluorescent tubes 41 and 41 reaches the second transmissive regions PA2.

Thus, the head-on light with a relatively high intensity passes through the first transmissive regions PA1, which have a lower transmissivity than the second transmissive regions PA2; that is, it passes through the transmissive regions PA1 with a relatively low transmissivity. This reduces the amount of light which manages to travel by passing through the first transmissive regions PA1. As a result, in the first transmissive regions PA1, no rise in brightness resulting from the passage of an excessive amount of light occurs.

The light that travels by passing through the intervals between the fluorescent tubes 41 and 41, on the other hand, has a lower intensity than the head-on light. This light with a low intensity passes through the second transmissive regions PA2 with a higher transmissivity than the first transmissive regions PA1; that is, it passes through the second transmissive regions PA2 with a relatively high transmissivity. This makes it easier for the amount of light which travels by passing through the second transmissive regions PA2 to reach a certain amount. As a result, in the second transmissive regions PA2, no drop in brightness resulting from a shortage of light occurs.

Thus, in the backlight unit 52 above, that is, in a backlight unit in which the transmissivity TY1, which is the transmissivity of the first transmissive regions PA1, is lower than the transmissivity TY2, which is the transmissivity of the second transmissive regions PA2 (TY1<TY2), no excessive rise or drop in brightness occurs in the surface of the diffusion unit 1, and thus no unevenness in the amount of backlight occurs. In particular, no unevenness in the amount of light (lamp unevenness) resulting from an image of the fluorescent tubes 41 being projected on the liquid crystal display panel 51 occurs.

What has been described in terms of light transmissivity above can also be described in terms of light absorptivity (the same reference signs will be adhered to for the same regions etc., even with different names). Specifically, a plurality of optical members OD with different absorptivities may be contained in the interposed layer 23. That is, instead of optical members OD all having the same absorptivity, optical members OD having different absorptivities are mixedly contained in the interposed layer. More specifically, when a region formed by linear optical members OD with the same absorptivity being gathered together is called an absorptive region PA, a plurality of absorptive regions PA with different absorptivities are formed in the surface of the interposed layer 23. Thus, a plurality of transmissive regions PA having different absorptivities lie mixedly in the surface of the diffusion unit 1.

In such a case, as shown in FIGS. 1, 2A and 2B, it is preferable that the absorptive regions PA (called the first absorptive regions PA) laid over the fluorescent tubes 41 in the overlay direction P of the fluorescent tubes 41 and the diffusion unit 1 have a higher absorptivity than the absorptive regions PA (called the second absorptive regions PA2) laid only over the intervals between the fluorescent tubes 41 and 41 in the overlay direction P of the fluorescent tubes 41 and the diffusion unit 1.

This causes light such as the head-on light reach the first absorptive regions PA1, and causes the light that travels by passing through the intervals between the fluorescent tubes 41 and 41, reach the second absorptive regions PA2. Thus, the head-on light is absorbed in the absorptive regions PA1, which have a higher absorptivity than the second absorptive regions PA2; that is, it is absorbed in the absorptive regions PA1 with a relatively high absorptivity. This reduces the amount of light which is not absorbed in the first absorptive regions PA1 and which thus, for example, manages to travel by passing through the first absorptive regions PA1. As a result, in the first transmissive regions PA1, no rise in brightness resulting from the passage of an excessive amount of light occurs.

The light that travels by passing through the intervals between the fluorescent tubes 41 and 41, on the other hand, is absorbed in the second absorptive regions PA2, which have a lower absorptivity than the first absorptive regions PA1; that is, it is absorbed in the second absorptive regions PA2 with a relatively low absorptivity. This makes it easier for the amount of light which is not absorbed in the second transmissive regions PA2 and which thus, for example, manages to travel by passing through the second transmissive regions PA2 to reach a certain amount. As a result, in the second transmissive regions PA2, no drop in brightness resulting from a shortage of light occurs.

Thus, in the backlight unit 52 above, that is, in a backlight unit in which the absorptivity AY1, which is the absorptivity of the first absorptive regions PA1, is higher than the absorptivity AY2, which is the absorptivity of the second absorptive regions PA2 (AY1>AY2), no excessive rise or drop in brightness occurs in the surface of the diffusion unit 1, and thus no unevenness in the amount of backlight occurs.

Second Preferred Embodiment

A second preferred embodiment will now be described. Note that members having similar functions to those used in the first preferred embodiment are identified by common reference numerals, and no description of them will be repeated. The description of this preferred embodiment pays attention to, among the characteristics of the optical members OD, their reflectance.

From the viewpoint of reflectance as one of their characteristics, a plurality of optical members OD with different reflectivities are contained in the interposed layer 23. That is, instead of optical members OD all having the same reflectivity, optical members OD having different reflectivities are mixedly contained in the interposed layer. More specifically, when a region formed by linear optical members OD with the same reflectivity being gathered together is called a reflective region RA, a plurality of reflective regions RA with different reflectivities are formed in the surface of the interposed layer 23. Thus, a plurality of reflective regions RA having different reflectivities lie mixedly in the surface of the diffusion unit 1.

Figure 3:
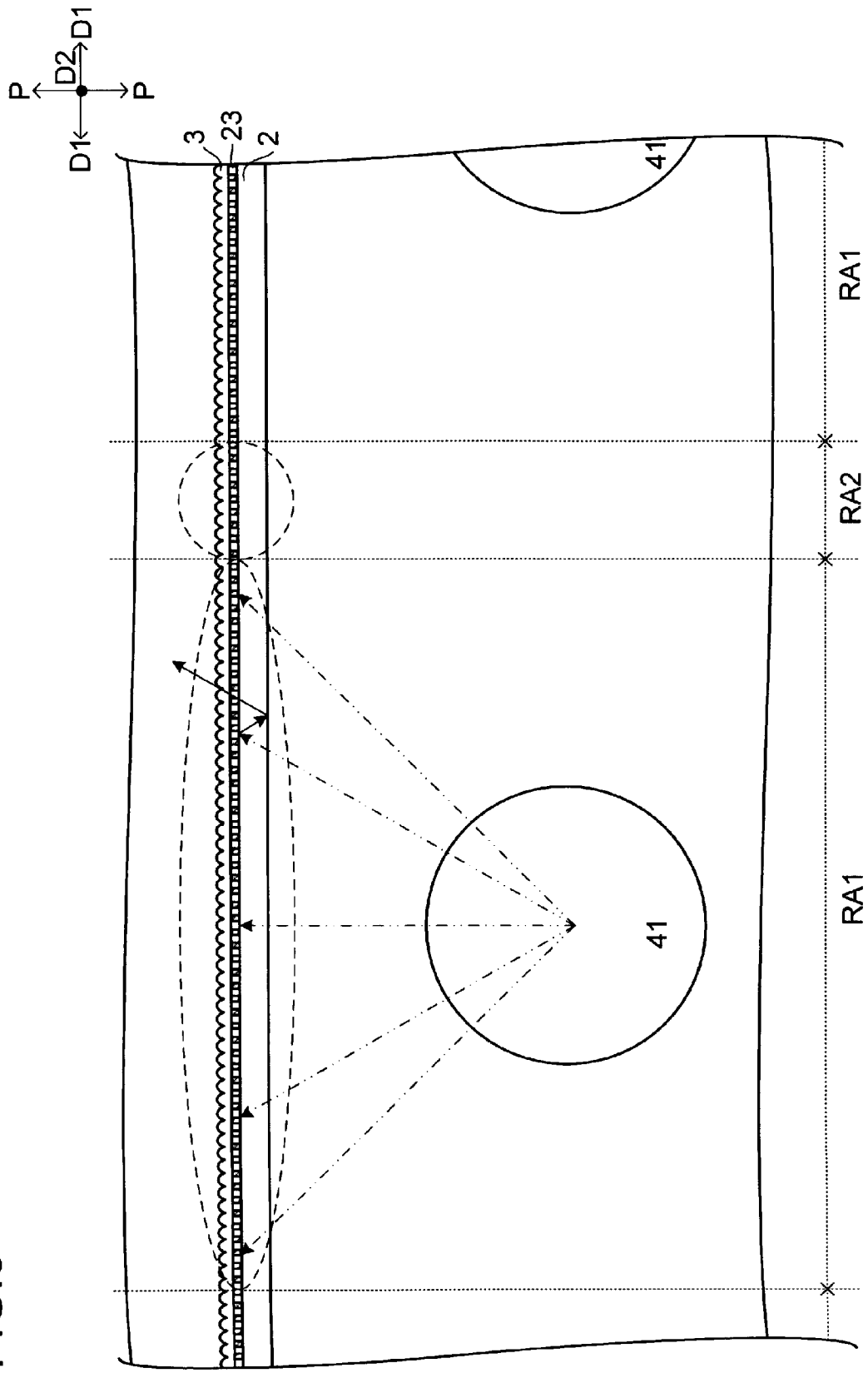
FIG. 3 is an enlarged sectional view showing another example of FIG. 1.
Figure 4A:
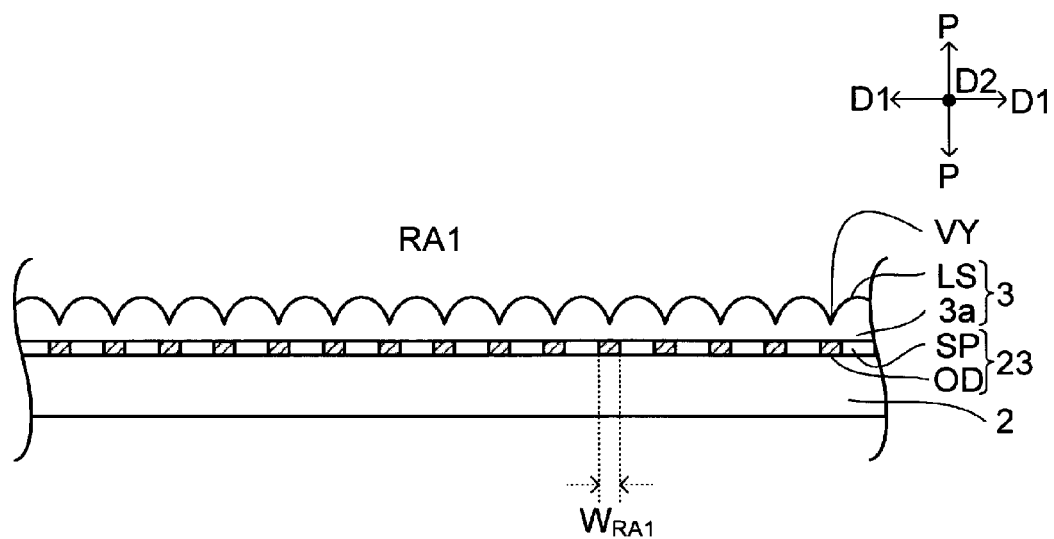
FIG. 4A is an enlarged sectional view of the first reflective region shown in FIG. 3.
Figure 4B:
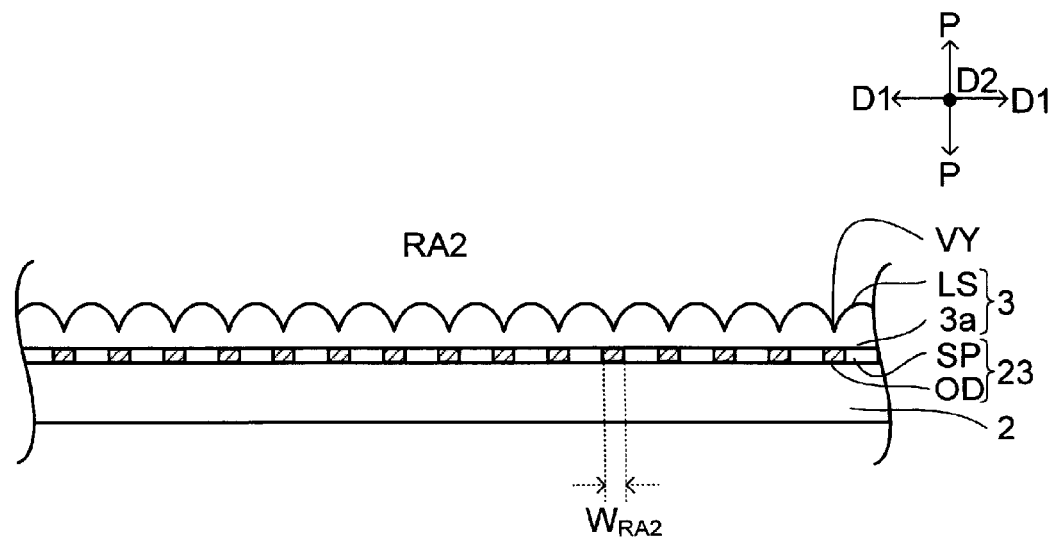
FIG. 4B is an enlarged sectional view of the second reflective region shown in FIG. 3.

This backlight unit 52 is shown in detail in FIG. 3, which is an enlarged sectional view of the shorter-side section in FIG. 13, and in FIGS. 4A and 4B (which are enlarged sectional views of the parts encircled by broken lines in FIG. 3). Note that $W_{RA1}$, which represents the width of the optical members OD in the later-described first reflective regions RA1, and $W_{RA2}$, which represents the width of the optical members OD in the later-described second reflective regions RA2, are the same.

It is preferable that the reflective regions RA (called the first reflective regions RA1) laid, in the overlay direction P of the fluorescent tubes 41 and the diffusion unit 1, over the fluorescent tubes 41 and at least portions of the intervals between the fluorescent tubes 41 and 41 lying in the array direction of the optical members OD (first direction D1) have a higher reflectivity than the reflective regions RA (called the second reflective regions RA2) laid, in the overlay direction P of the fluorescent tubes 41 and the diffusion unit 1, over at least the centers of the intervals between the fluorescent tubes 41 and 41 lying in the array direction of the optical members OD.

Generally, the light from the fluorescent tubes 41 diverges as it travels. That is, the light travels in a form radiating from the fluorescent tubes 41 themselves as shown in the sectional view in FIG. 3 (see the dash-dot-dot-line arrows). Thus, a large portion of the light which diverges as it travels from the fluorescent tubes 41 reaches the first reflective regions RA1, which have a higher reflectivity than the second reflective regions RA2, that is, the first reflective regions RA1 with a relatively high reflectivity, from which the light is then reflected in various directions.

Here, the reflected light travels so as to return to the diffusion plate 2, from which the light traveling to the first reflective regions RA1 (see the solid-line arrow) has originated. This returning light is then reflected on one surface of the diffusion plate 2, and travels toward the interposed layer 23 again (see the solid-line arrow). When the reflected light travels toward the gaps SP between optical members OD and OD, the light then passes through the gaps SP.

That is, by being reflected by the first reflective regions RA1, the light which has failed to pass through the optical members OD passes through the diffusion unit 1. In this way, the reflected light is reused. Moreover, as a result of a relatively large amount of light being reflected on the first reflective regions RA1, only a small amount of light remains unreflected (for example, it is instead transmitted). This prevents a rise in brightness resulting from the passage of an excessive amount of light from occurring in the reflective regions RA1.

In addition, the second reflective regions RA2, laid at least over the centers of the intervals between the fluorescent tubes 41 and 41 lying in the first direction D1, which is the array direction of the optical members OD, tend to be portions that light is most unlikely to reach. The second reflective regions RA2, however, have a lower reflectivity than the first reflective regions RA1, that is, the second reflective regions RA2 have a relatively low reflectivity. Accordingly, as a result of a relatively small amount of light being reflected on the second reflective regions RA2, a large amount of light remains unreflected (for example, it is instead transmitted). Thus, no drop in brightness resulting from a shortage of light occurs in the second reflective regions RA2.

Thus, in the backlight unit 52 above, that is, in a backlight unit in which the reflectivity RY1, which is the reflectivity of the first reflective regions RA1, is higher than the reflectivity RY2, which is the reflectivity of the second reflective regions RA2 (RY1>RY2), no excessive rise or drop in brightness occurs in the surface of the diffusion unit 1, and thus no unevenness in the amount of backlight occurs.

Third Preferred Embodiment

A third preferred embodiment will now be described. Note that members having similar functions to those used in the first and second preferred embodiments are identified by common reference numerals, and no description of them will be repeated. In this preferred embodiment, a description will be given of the gaps SP created between optical members OD and OD.

The optical members OD lie discontinuously in the interposed layer 23. Thus, gaps SP through which light can pass are created between optical members OD and OD. When the proportion occupied by the gaps SP per predetermined area of the diffusion unit 1 is defined as the gap ratio (or called the aperture ratio), the following can be said about the backlight unit 52.

In the surface of the interposed layer 23 in the diffusion unit 1 of the backlight unit 52, a plurality of gaps SP having different areas are formed; thus, instead of gaps SP all having the same area, gaps SP having different areas are mixedly contained in the interposed layer.

More specifically, in the interposed layer 23, gaps SP with the same area are gathered together as a result of linear optical members OD with the same area being gathered together, and when a region formed by gaps SP with the same area being gathered together is called a light-passage region HA, a plurality of light-passage regions HA with different gap ratios are formed in the surface of the interposed layer 23. Thus, a plurality of light-passage regions HA with different gap ratios lie mixedly in the surface of the diffusion unit 1.

Figure 5:
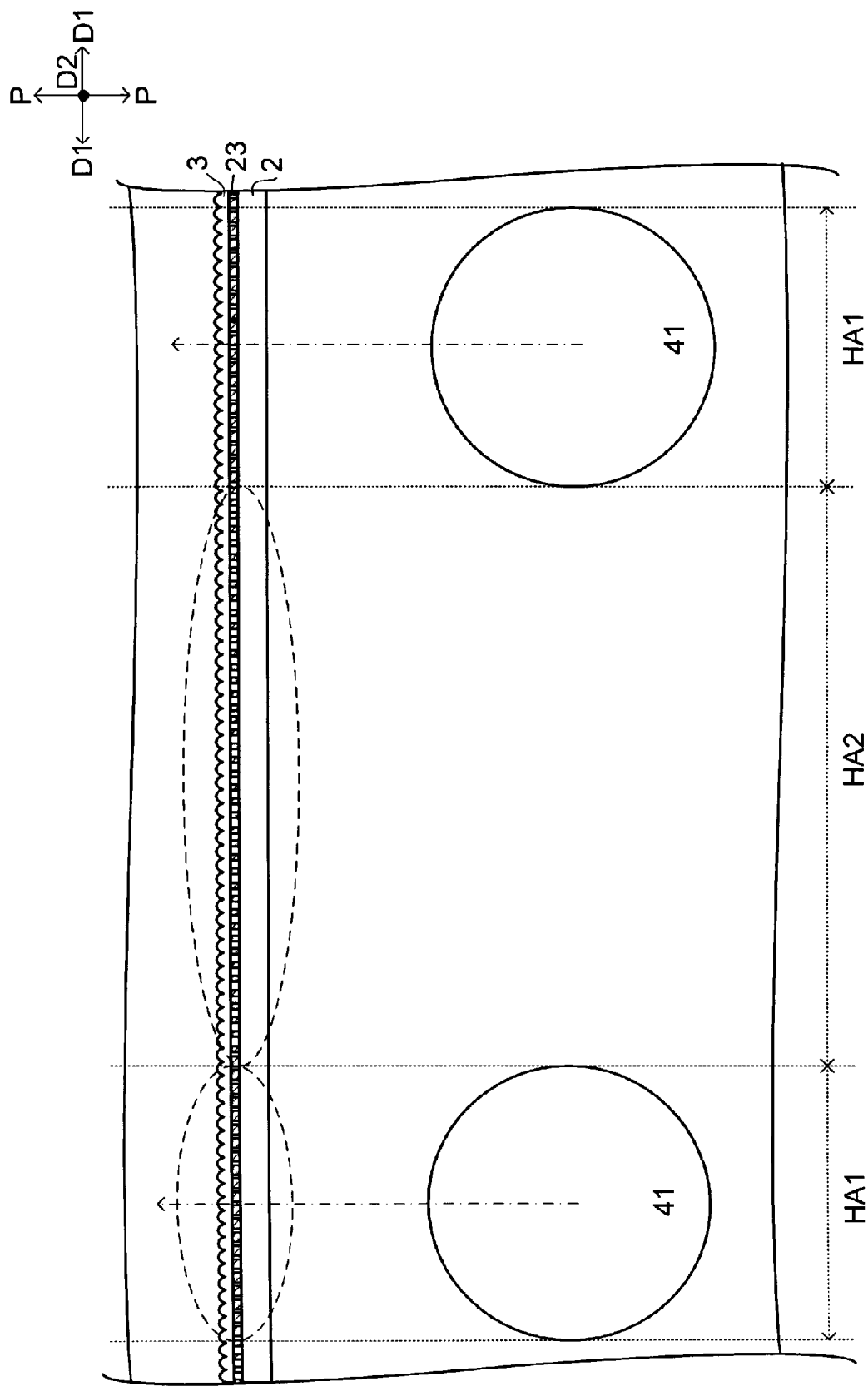
FIG. 5 is an enlarged sectional view showing another example of FIGS. 1 and 3.
Figure 6A:
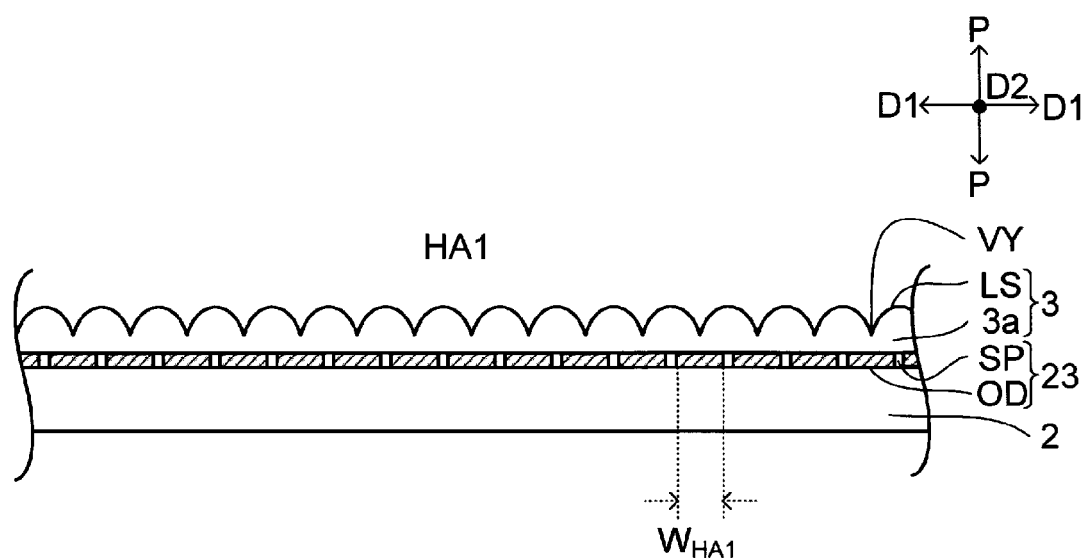
FIG. 6A is an enlarged sectional view of the first light-passage region shown in FIG. 5.
Figure 6B:
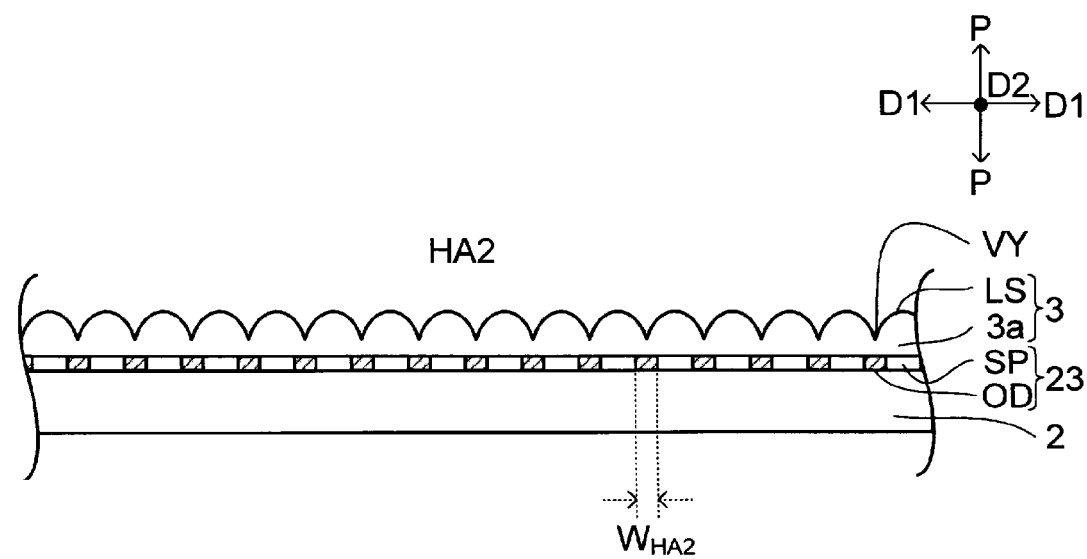
FIG. 6B is an enlarged sectional view of the second light-passage region shown in FIG. 5.

This backlight unit 52 is shown in detail in FIG. 5, which is an enlarged sectional view of the shorter-side section in FIG. 13, and in FIGS. 6A and 6B (which are enlarged sectional views of the parts encircled by broken lines in FIG. 6). Note that $W_{HA1}$, which represents the width of the optical members OD in the later-described first light-passage regions HA1, and $W_{HA2}$, which represents the width of the optical members OD in the later-described second light-passage regions HA2, are not the same, but $W_{HA1} > W_{HA2}$.

It is preferable that the light-passage regions HA (called the first light-passage regions HA1) laid, in the overlay direction P of the fluorescent tubes 41 and the diffusion unit 1, at least over the fluorescent tubes 41 have a lower gap ratio than the light-passage regions HA (called the second light-passage regions HA2) laid, in the overlay direction P of the fluorescent tubes 41 and the diffusion unit 1, only over the intervals between the fluorescent tubes 41 and 41.

Generally, a relatively large amount of light (the head-on light, etc) reaches the first light-passage regions HA1. However, in the first light-passage regions HA1, which have a lower gap ratio than the second light-passage regions HA2, that is, in the first light-passage regions HA1 with a relatively low gap ratio, due to the low gap ratio, only a small amount of light manages to travel by passing through the gaps. Thus, even though a relatively large amount of light reaches the first light-passage regions HA1, the light does not travel excessively through the gaps SP. As a result, in the first light-passage regions HA1, no rise in brightness resulting from the passage of an excessive amount of light occurs.

On the other hand, a relatively small amount of light which travels by passing through the intervals between light sources reaches the second light-passage regions HA2. However, in the second light-passage regions HA2, which have a high gap ratio than the first light-passage regions HA1, that is, in the second light-passage regions HA2 with a relatively high gap ratio, due to the high gap ratio, it is easier for the amount of light which travels by passing through the intervals to reach a certain amount. Thus, even though only a relatively small amount of light reaches the second light-passage regions HA2, the light travels sufficiently through the gaps SP. As a result, in the second light-passage regions HA2, no drop in brightness resulting from a shortage of light occurs.

Thus, in the backlight unit 52 above, that is, in a backlight unit in which the gap ratio GY1, which is the gap ratio of the first light-passage regions HA1, is lower than the gap ratio GY2, which is the gap ratio of the second light-passage regions HA2 (GY1<GY2), no excessive rise or drop in brightness occurs in the surface of the diffusion unit 1, and thus no unevenness in the amount of backlight occurs.

Note that the first light-passage regions HA1 are the same regions as the first transmissive regions PA1, and the second light-passage regions HA2 are the same regions as the second transmissive regions PA2. Thus, it is preferable that the optical members OD contained in the first light-passage regions HA1 have a lower transmissivity than the optical members OD contained in the second light-passage regions HA2.

With this design, in the first light-passage regions HA1 (first transmissive regions PA1), not only the light which manages to travel by passing through the gaps SP is reduced to a relatively small amount, but the light which travels by passing through the optical members OD contained in the first light-passage regions HA1 is also reduced to a relatively small amount. By contrast, in the second light-passage regions HA2 (second transmissive regions PA2), not only the light which manages to travel by passing through the gaps SP is increased to a relatively large amount, but the light which travels by passing through the optical members OD contained in the second light-passage regions HA2 is also increased to a relatively large amount.

That is, the adjustment of light amount owing to the gaps SP and the adjustment of light amount by passing through of the optical members OD are performed simultaneously, and thus unevenness in the amount of backlight is further prevented from occurring in the backlight unit.

In the liquid crystal display device 59 incorporating the backlight unit 52, typically, relatively high brightness needs to be secured at the screen center (the center of the liquid crystal display panel 51). Thus, if brightness is insufficient in the first light-passage regions HA1, which are close to the center Z (see FIG. 12) of the surface of the diffusion unit 1, the center Z corresponding to the screen center, degraded display quality on the liquid crystal display device 59 may result.

Figure 8A:
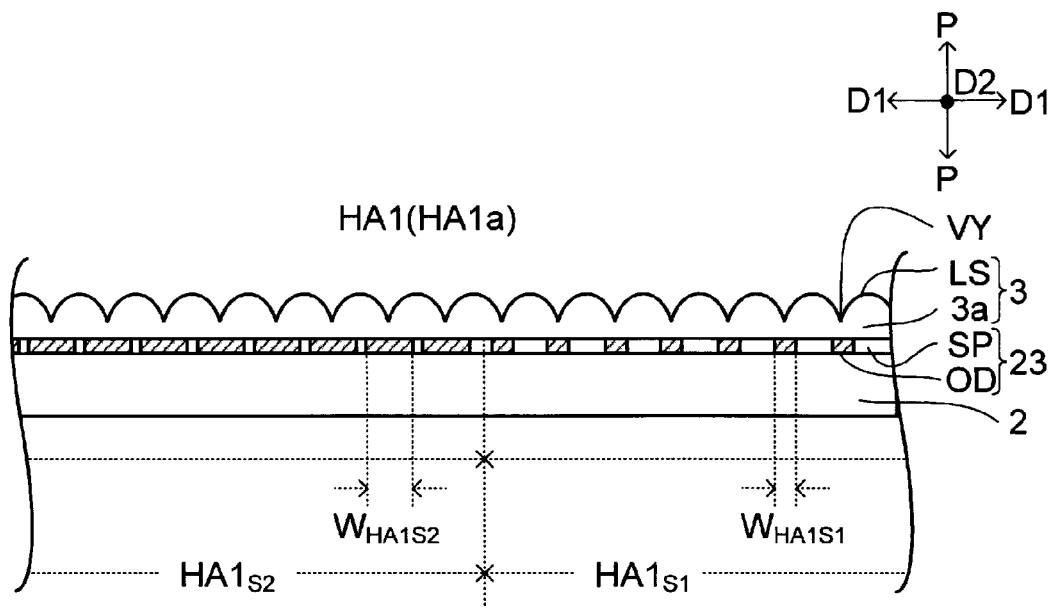
FIG. 8A is an enlarged sectional view showing the first light-passage region next to, on one side of, the center Z of the surface of the diffusion unit 1 shown in FIG. 7.
Figure 8B:
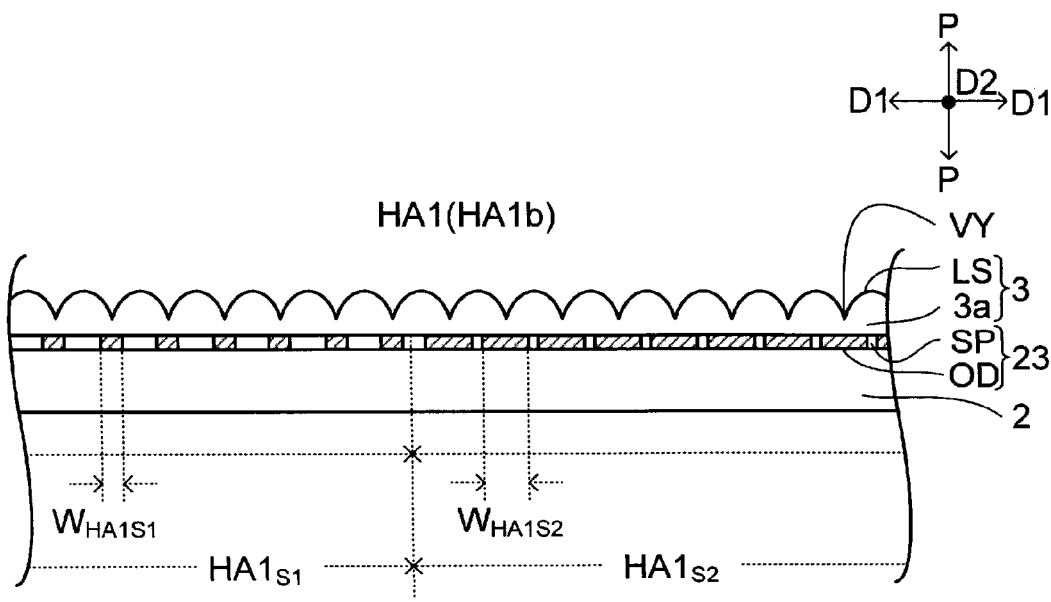
FIG. 8B is an enlarged sectional view showing the first light-passage region next to, on the other side of, the center Z of the surface of the diffusion unit 1 shown in FIG. 7.

This backlight unit 52 is shown in detail in FIG. 7, which is an enlarged sectional view of the shorter-side section in FIG. 13, and in FIGS. 8A and 8B (which are enlarged sectional views of the parts encircled by broken lines in FIG. 7) Specifically, a plurality of portions $HA1_{S1}$ and $HA1_{S2}$ with different gap ratios are laid in the first light-passage regions HA1a and HA1b, which are located next to the center Z of the surface of the diffusion unit 1. Note that $W_{HA1S1}$, which represents the width of the optical members OD in the portions $HA1_{S1}$, and $W_{HA1S2}$, which represents the width of the optical members OD in the portions $HA1_{S2}$, are not the same, but $W_{HA1S1} < W_{HA1S2}$.

It is preferable that, among the portions $HA1_{S1}$, and $HA1_{S2}$, the portions $HA1_{S1}$, having a high gap ratio be located closer to the center Z of the surface of the diffusion unit 1, and the portions $HA1_{S2}$ having a low gap ratio be located away from the center Z of the surface of the diffusion unit 1. This makes the portions $HA1_{S1}$ brighter than the portions $HA1_{S2}$, and thus no shortage of brightness occurs in the screen center of the liquid crystal display panel 51.

As shown in FIGS. 7, 8A and 8B, in a case where the plurality of portions with different gap ratios in the first light-passage regions HA1 divide into two kinds (parts $HA1_{S1}$ and portions $HA1_{S2}$), the backlight unit 52 may be, as one example, so designed that the portions $HA1_{S1}$, with a high gap ratio have the same gap ratio as the second light-passage regions HA2 laid next to the first light-passage regions HA1, and that the portions $HA1_{S2}$ with a low gap ratio have a lower gap ratio than the second light-passage regions HA2 laid next to the first light-passage regions HA1.

With this design, instead of portions with a gap ratio that neither the first light-passage regions HA1 nor the second light-passage regions HA2 has being newly formed, portions with the same gap ratio as the second light-passage regions HA2 are only extended into the first light-passage regions HA1. This makes it easy to fabricate the diffusion unit 1.

Note that, although there is no particular restriction on the gap ratio, the first light-passage regions HA1 are given a gap ratio of about 20% (more specifically, a gap ratio higher than 0% but lower than 30%), and the second light-passage regions HA2 are given a gap ratio of about 30%, for example.

Other Preferred Embodiments

It is to be understood that the preferred embodiments described above are not meant to limit the present invention, which allows many variations and modifications within the scope not departing from the spirit of the invention.

Figure 9:
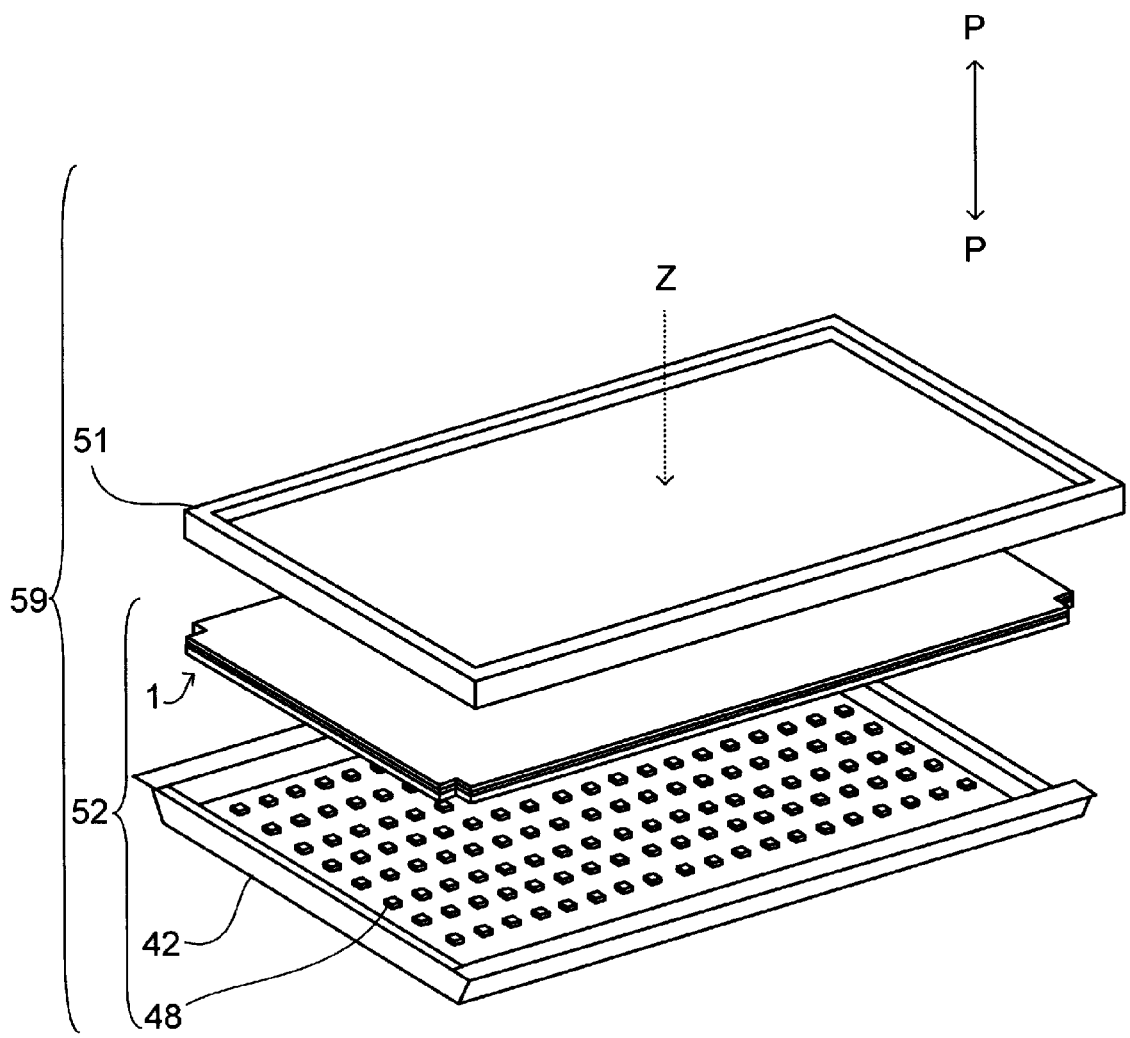
FIG. 9 is an exploded perspective view of a liquid crystal display device incorporating LEDs as light sources.

For example, although the description above deals with an example in which fluorescent tubes 41 are preferably used as light sources, this is not meant to limit the invention; as shown in an exploded perspective view in FIG. 9, it is also possible, instead, to use LEDs (light emitting diodes) 48, which are point light sources, as light sources.

Figure 10A:
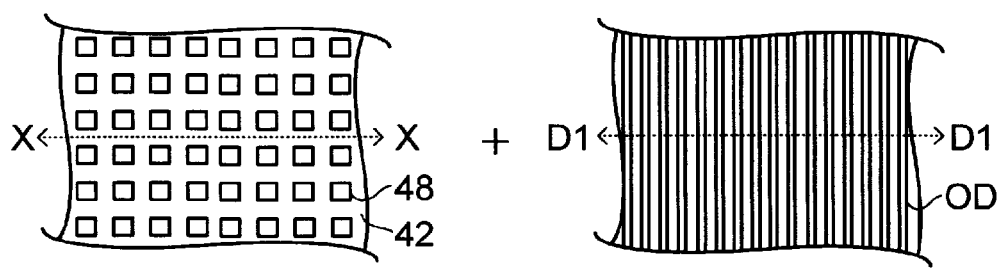
FIG. 10A is a plan view showing the row direction of LEDs arrayed in a matrix, and optical members arrayed in the same direction as the row direction.
Figure 10B:
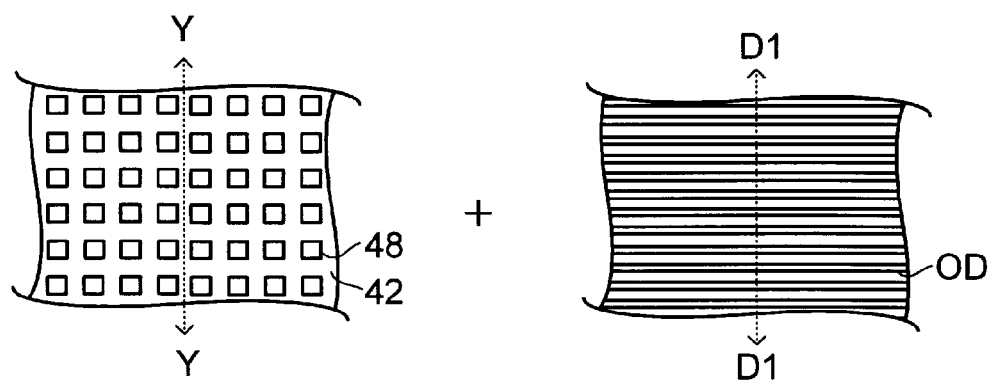
FIG. 10B is a plan view showing the column direction of LEDs arrayed in a matrix, and optical members arrayed in the same direction as the column direction.

In a case where the LEDs 48 are arrayed in a matrix, as shown in FIG. 10A, preferably, the row direction X of the LEDs 48 arrayed in a matrix is the same as the first direction D1, which is the array direction of the optical members OD. On the other hand, as shown in FIG. 10B, preferably, the column direction Y of the LEDs 48 arrayed in a matrix is the same as the first direction D1, which is the array direction of the optical members OD.

That is, when the LEDs 48 are arrayed in a matrix, it is preferable that the direction in which rows extend (row direction X) or the direction in which columns extend (column direction Y) in the matrix be the same as the array direction (first direction D1) of the optical members OD.

Generally, the light traveling from LEDs 48 that are arrayed in the row direction X or the column direction Y in a matrix into the diffusion unit 1 can be said to be continuous light (linear light). Thus, if the optical members OD are arrayed in the same direction as the array direction of continuous light (namely the row direction X or the column direction Y), as in the backlight unit 52 incorporating the fluorescent tubes 41, the occurrence of unevenness in the amount of backlight is prevented.

Two directions (the row direction X or the column direction Y) can be assumed as the array direction of continuous light, and thus, in a case of the backlight unit 52 incorporating the LEDs 48, two directions can be assumed also as the array direction of the various regions described above (the first transmissive regions PA1 and the second transmissive regions PA2, the first absorptive regions PA1 and the second absorptive regions PA2, the first reflective regions RA1 and the second reflective regions RA2, and the first light-passage regions HA1 and the second light-passage regions HA2).

The first transmissive regions PA1, the first absorptive regions PA1, the first reflective regions RA1, and the first light-passage regions HA1 are laid, as seen in the overlay direction P, not only over the LEDs 48, but also over the intervals between the LEDs 48 and 48. Thus, these regions PA1, RA1, and HA1 can be said to be regions that are laid at least over the LEDs 48 in the overlay direction P. By contrast, the second transmissive regions PA2, the second absorptive regions PA2, the second reflective regions RA2, and the second light-passage regions HA2 can be said to be regions that are not laid over the LEDs 48 in the overlay direction P (regions laid only over the intervals between the LEDs 48 and 48).

So long as the optical members OD include at least a base ingredient and dispersed particles, there is no particular restriction on their materials. Examples of the base ingredient include acrylic resin, and examples of the dispersed particles include particles of titanium oxide.

In a case of optical members OD containing acrylic resin with titanium oxide dispersed in them as mentioned above, through adjustment of, for example, the composition of titanium oxide, the particle diameter of titanium oxide, and the dispersion amount of titanium oxide, there have been obtained optical members OD that offer various characteristics (in terms of transmittance, absorptance, and reflectance).

There is no particular restriction on the location of the optical members OD; however, as shown in FIGS. 2, 4, 6, and 8, it is preferable that the optical members OD be laid over the seams VY (valleys VY) between the cylindrical lenses LS and LS in the overlay direction P. The reason is that the light incident on the valleys VY is less affected by the refraction by the cylindrical lenses LS, and thus, covering the valleys VY with the optical members OD helps prevent generation of light traveling without being affected by refraction.

In the liquid crystal display device 59 incorporating the backlight unit 52, typically, data lines, which feed data signals to the pixels of the liquid crystal display panel 51, are arrayed in parallel. In some cases, the array direction of the data lines is the same as the array direction of the optical members OD in the backlight unit 52. In such a case, moiré, which is caused by the arrangement of the optical members OD and the arrangement of data lines, appears on the liquid crystal display panel 51.

Figure 11:
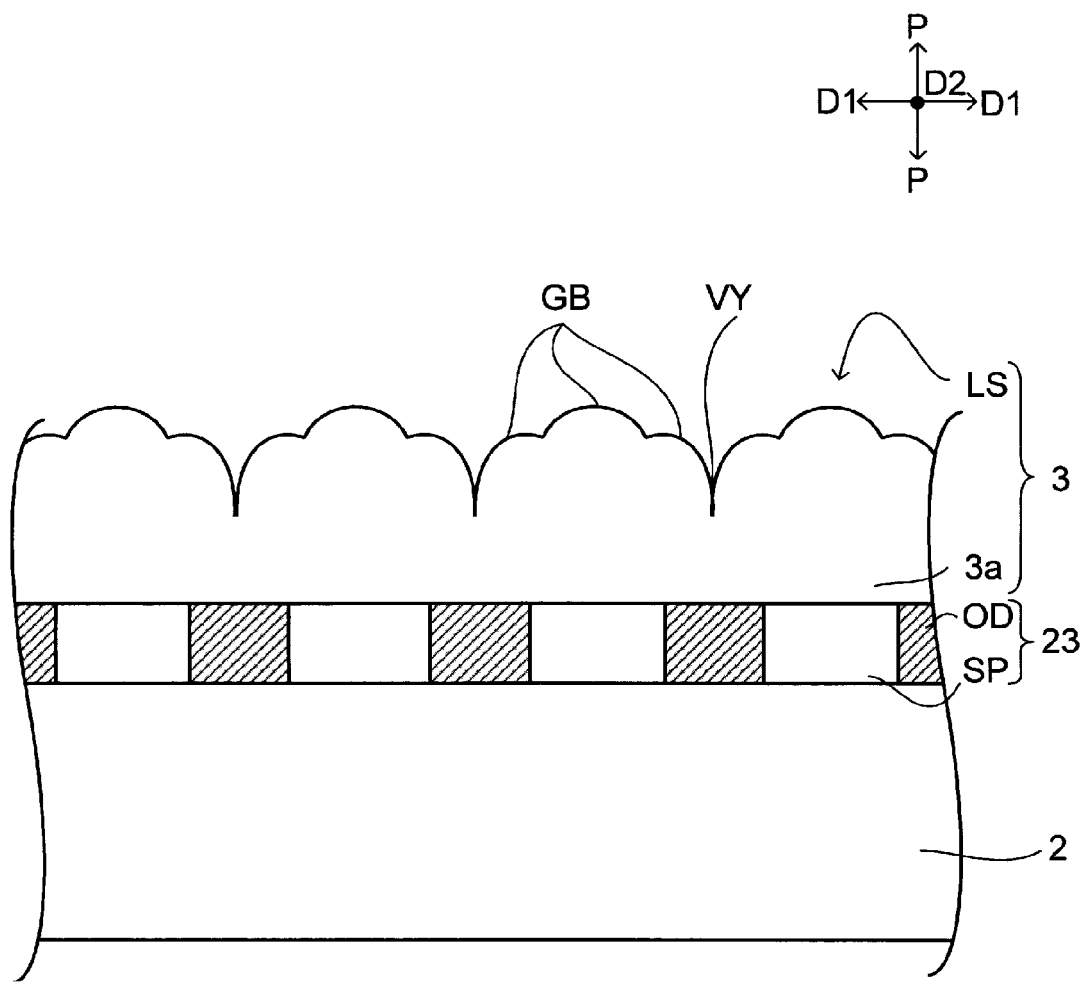
FIG. 11 is an enlarged sectional view of a lenticular lens layer.

In order to prevent moiré, on the surface of each cylindrical lens LS in the lenticular lens layer 3, as shown in a sectional view in FIG. 11, there are formed a plurality of bumps GB, GB, and GB; preferably, the length direction of the bumps GB, GB, and GB extends in the same direction in which the optical members OD extend.

With this design, by the bumps GB, GB, and GB, the regularity which occurs between the arrangement of the optical members OD and the arrangement of the data lines is cancelled, and thus moiré is prevented.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight unit comprising:
a plurality of light sources; and
a diffusion unit laid over the plurality of light sources and including a diffusion plate arranged to receive light from the plurality of light sources, a lenticular lens layer disposed on the diffusion plate, and an optical member containing dispersed particles interposed in between; wherein
the optical member includes a plurality of optical members with different transmissivities provided in an interposed layer located between the diffusion plate and the lenticular lens layer.

2. The backlight unit according to claim 1, wherein the linear-shaped optical members are arrayed in parallel or substantially in parallel in the interposed layer, and when a region defined by linear optical members with a same transmissivity being arranged together is a transmissive region, a plurality of transmissive regions with different transmissivities are located in a surface of the interposed layer.

3. The backlight unit according to claim 2, wherein a transmissive region laid at least over a light source in an overlay direction of the light sources and the diffusion unit has a lower transmissivity than a transmissive region laid only over an interval between light sources.

4. A backlight unit comprising:
a plurality of light sources; and
a diffusion unit laid over the plurality of light sources and including a diffusion plate arranged to receive light from the plurality of light sources, a lenticular lens layer disposed on the diffusion plate, and an optical member containing dispersed particles interposed in between; wherein
the optical member includes a plurality of optical members with different reflectivities provided in an interposed layer located between the diffusion plate and the lenticular lens layer.

5. The backlight unit according to claim 4, wherein the optical members linear in shape are arrayed in parallel or substantially in parallel with gaps secured therebetween in the interposed layer, and when a region defined by linear optical members with a same reflectivity being gathered together is a reflective region, a plurality of reflective regions with different reflectivities are located in a surface of the interposed layer.

6. The backlight unit according to claim 5, wherein a reflective region laid in an overlay direction of the light sources and the diffusion unit, at least over a light source and at least over a portion of an interval between light sources lying in an array direction of the optical members has a higher reflectivity than a reflective region laid, in the overlay direction of the light sources and the diffusion unit, at least over a center of an interval between light sources lying in the array direction of the optical members.

7. A backlight unit comprising:
a plurality of light sources; and
a diffusion unit laid over the plurality of light sources and including a diffusion plate arranged to receive light from the plurality of light sources, a lenticular lens layer disposed on the diffusion plate, and optical members containing dispersed particles interposed in between; wherein
an interval between the optical members created by the optical members being laid discontinuously in an interposed layer located between the diffusion plate and the lenticular lens layer is a gap through which light can pass, and a plurality of gaps with different areas are formed in a surface of the interposed layer.

8. The backlight unit according to claim 7, wherein the linear-shaped optical members are arrayed in parallel or substantially in parallel in the interposed layer, and gaps with a same area are arranged together as a result of linear-shaped optical members with a same area being gathered together, and when a region formed by the gaps with the same area being gathered together is a light-passage region, a plurality of light-passage regions with different gap ratios are provided in the surface of the interposed layer.

9. The backlight unit according to claim 8, wherein a light-passage region laid at least over a light source in an overlay direction of the light sources and the diffusion unit has a lower gap ratio than a light-passage region laid only over an interval between light sources in the overlay direction of the light sources and the diffusion unit.

10. The backlight unit according to claim 9, wherein an optical member contained in a light-passage region laid at least over a light source in the overlay direction of the light sources and the diffusion unit has a lower transmissivity than an optical member contained in a light-passage region laid only over an interval between light sources in the overlay direction of the light sources and the diffusion unit.

11. The backlight unit according to claim 10, wherein when a light-passage region laid at least over a light source in the overlay direction of the light sources and the diffusion unit is a first light-passage region, a plurality of portions with different gap ratios are laid in the first light-passage region located next to a center of a surface of the diffusion unit, and among the plurality of portions, a portion having a high gap ratio is located closer to a center of a surface of the diffusion unit, and a portion having a low gap ratio is spaced away from the center of the surface of the diffusion unit.

12. The backlight unit according to claim 11, wherein when a light-passage region laid only over an interval between light sources in the overlay direction of the light sources and the diffusion unit is a second light-passage region and the plurality of portions with different gap ratios in the first light-passage region are divided into two kinds, a portion with a high gap ratio has a same gap ratio as a second light-passage region laid next to the first light-passage region, and a portion with a low gap ratio has a lower gap ratio than the second light-passage region laid next to the first light-passage region.

13. The backlight unit according to claim 1, wherein the light sources are linear light sources are arrayed in parallel or substantially in parallel in a same direction in which the optical members are arrayed.

14. The backlight unit according to claim 1, wherein the light sources are point light sources arrayed in a matrix, and a direction in which rows extend or a direction in which columns extend in the matrix is the same as a direction in which the optical members are arrayed.

15. The backlight unit according to claim 1, wherein the dispersed particles are particles of titanium oxide.

16. The backlight unit according to claim 1, wherein a plurality of bumps are located on a surface of each cylindrical lens in the lenticular lens layer, and a length direction of the bumps extends in a same direction in which the optical members extend.

17. A liquid crystal display device comprising:
the backlight unit according to claim 1; and
a liquid crystal display panel arranged to receive light from the backlight unit.

* * * * *